Feb. 22, 1955
W. WAGNER
2,702,415
REPLACEMENT GASKET FOR REFRIGERATOR DOORS
Filed May 2, 1950
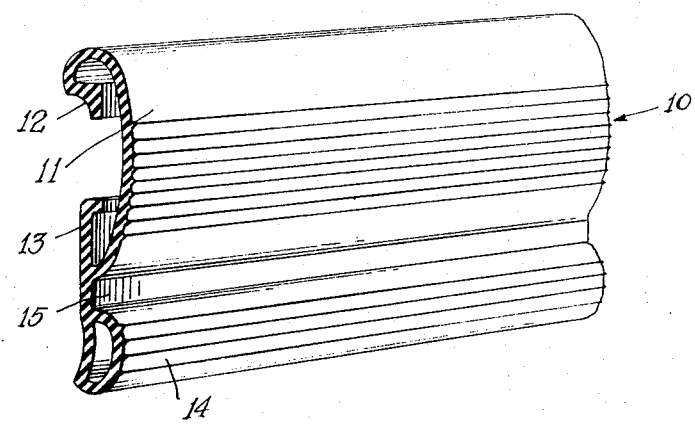
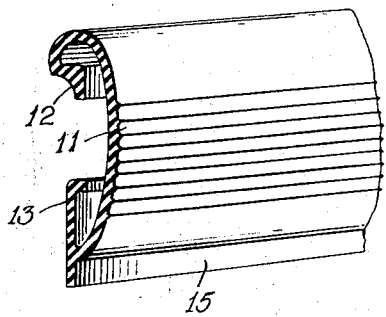
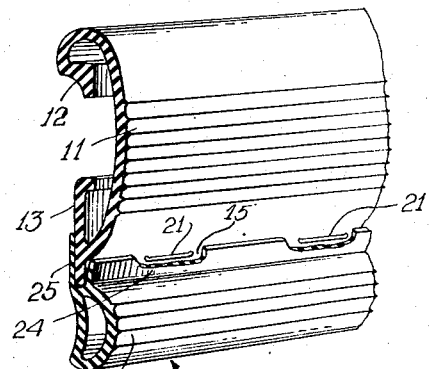
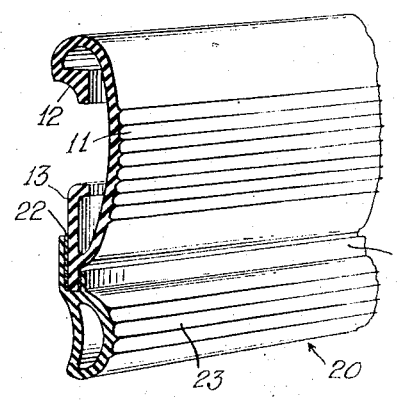
INVENTOR
WILLIAM WAGNER
BY
ATTORNEY

United States Patent Office 2,702,415
Patented Feb. 22, 1955

2,702,415

REPLACEMENT GASKET FOR REFRIGERATOR DOORS

William Wagner, Brooklyn, N. Y.

Application May 2, 1950, Serial No. 159,524

1 Claim. (Cl. 20—69)

This invention relates to a replacement gasket for refrigerator doors and the like and to the method of applying the same.

Refrigerators normally have a longer operative life than the rubber gaskets on their doors. It is necessary, therefore, to replace the rubber gasket at least five or ten times on a conventional refrigerator, in order to maintain its efficiency. In some refrigerators, the problem of replacing the rubber gasket is not a very serious one and it may be replaced without great difficulty in a matter of minutes. In other refrigerators, however, the problem assumes more serious proportions and it frequently becomes necessary for a skilled mechanic to spend several hours in order to replace a single gasket. This is especially true of rubber gaskets on the doors of refrigerators made by General Motors and sold under the trade-mark Frigidaire. In the replacement of rubber gaskets on some refrigerators, the total cost of the job, including labor and materials, would amount to but several dollars at the very most but the owner of a Fridigaire must expend approximately $15.00 to $20.00 to effect a replacement of the gasket on his refrigerator.

It is important to note that it is not the entire gasket which deteriorates during the course of normal use and abuse but only the bead which is compressed when the refrigerator door is closed and which tends to resume its normally expanded condition when the door is opened. In some refrigerators, the bead constitutes a major part of the gasket as a whole. In other refrigerators, such as the Frigidaire-type of refrigerator, the bead is but a minor part of the entire gasket. Nonetheless, when the bead goes bad, the entire gasket is discarded under conventional methods of gasket replacement.

It is the principal object of this invention to provide a replacement gasket for Frigidaire-type refrigerators and the like which is adapted to replace only the bead of the gasket and not the gasket as a whole. It is a corollary and equally important object of this invention to provide a method of extending the life span of rubber gaskets of the character under discussion by replacing the worn bead with a replacement bead of the type herein claimed.

When difficult replacement jobs are encountered, it is no longer necessary, with the present replacement gasket and the present method of applying the same, to completely remove the old gasket. All that need be done is to cut away the worn bead and to substitute therefor the replacement gasket herein claimed. This may be done by means of staples, or by means of a suitable adhesive or by any other suitable means. When the replacement bead, in its turn, becomes worn, it too may be replaced by a similar replacement bead and in accordance with the same replacement method. A very substantial saving in cost of materials and labors is thereby effected. The cost of a replacement bead of the character herein described and claimed is but a small fraction of the cost of the gasket as a whole. The time which it takes to remove the worn bead and to replace it with the present replacement bead is but a small fraction of the time it normally takes to replace the entire gasket with a replacement gasket of the same type.

Although the present invention relates primarily to refrigerators of the Frigidaire-type, it is equally applicable to other refrigerators wherein the same problem is encountered. Furthermore, this invention is applicable wherever gasket beads become worn and require replacement, and where a problem analogous to the problem above described is also encountered.

Preferred forms of this invention are shown in the accompanying drawing, and the several steps which the method herein claimed involves are also illustrated in the accompanying drawing. In this drawing:

Fig. 1 is a perspective view in transverse section of a rubber gasket of the type whose bead may be replaced in accordance with the present method and with the replacement gasket or bead of the present invention.

Fig. 2 is a similar view of the same gasket after its bead has been removed therefrom.

Fig. 3 is still another view of the same gasket showing a replacement gasket or bead affixed thereto by means of staples to take the place of the discarded bead.

Fig. 4 is a view similar to that of Fig. 3 showing the replacement gasket or bead affixed to the original gasket by means of a suitable adhesive.

Fig. 5 is a fragmentary perspective view of the modified form of replacement gasket or bead, showing it affixed to the original gasket by means of a suitable adhesive.

The rubber gasket 10 which is shown in Fig. 1 is a typical rubber gasket used on the doors of refrigerators of the Fridigaire type. The main body 11 of this gasket is provided with a pair of inwardly turned flanges 12 and 13 respectively which are held in place against the refrigerator door by means of a suitable panel board (not shown in the drawing). A bead 14 is provided along one edge of the main body of the gasket, being joined to said main body by means of a narrow neck 15. The main body 11 of the gasket, its two flanges 12 and 13, and the bead joining neck 15 are normally good for the life of the refrigerator. It is the bead 14 which deteriorates prematurely. It is a current practice at the present time to discard and replace the entire gasket when its bead goes bad.

The method of gasket replacement which is herein claimed includes as its first step the removal of worn bead 14. This bead may be cut away from connecting neck 15 as Fig. 2 clearly shows. The replacement gasket or bead 20 may then be affixed to the narrow neck portion 15 by means of staples 21 or by means of an adhesive 22 or by any other suitable means. More specifically, bead 20 comprises the bead portion 23, similarly to bead 14, and the pair of spaced, parallel flanges 24 and 25 respectively. These spaced flanges are adapted to accommodate the narrow neck portion 15 between them as Fig. 3 clearly shows. The staples may be driven into said narrow neck portion 15 and into lower flange 25 to affix the replacement gasket or bead to the original gasket. Flange 24 surface has a flap which covers the staples to conceal them from view.

When the adhesive 22 is used in the place and stead of staples 21, said adhesive should be applied in such manner that the two flanges 24 and 25 are both affixed to the original gasket. Thus the adhesive may be applied to the inner, facing surfaces of the two flanges 24 and 25 and also to the top and bottom surfaces of the narrow neck portion 15. In this manner, both flanges may be fastened to the original gasket for added strength and efficiency. The lower flange 25 may extend beyond the narrow neck portion in order to engage a portion of flange 13 of the original gasket.

Where it is either difficult or undesirable to insert a part of the replacement gasket or bead under neck 15 of the original gasket, said replacement gasket or bead may be fastened to the top of said neck portion only. Illustrative is the replacement gasket or bead 30 shown in Fig. 5. This replacement gasket or bead comprises a bead 31 which is similar to bead 23 above mentioned and a flange 32 which corresponds to the upper flange 24 of the replacement gasket or bead shown in Figs. 3 and 4. Flange 32 is elevated to accommodate the neck portion 15 of the original gasket underneath it. The lower surface of flange 32 may then be fastened to the upper surface of neck portion 15 by means of a suitable adhesive 22.

The foregoing is illustrative of the replacement gasket or bead herein claimed and of the method for applying the same to a conventional gasket. It will be understood that the replacement gasket or bead and the method of applying same which have herein been described may be modified many ways within the broad scope and spirit of the invention. It is also important to understand that this invention covers not only a replacement gasket or bead which may be used to replace a worn bead, but it also covers a combination gasket which may constitute original equipment, wherein the bead is removably affixed to the main body of the gasket. Said removable bead may be removed, when worn, and a similar bead may be substituted therefor.

I claim:

In combination, a refrigerator door gasket comprising a longitudinally extending web which is secured to the refrigerator door and a longitudinally extending flange which is integral with said web, and a replacement gasket comprising a longitudinally extending bead having a base portion which is adapted to be placed against the refrigerator door immediately adjacent the flange of the refrigerator door gasket and a longitudinally extending lip which is integral with said bead in offset relation to the base of the bead, the base of the bead and the flange of the refrigerator door gasket occupying a common plane and being in abutment with each other and disposed flat against the refrigerator door, said lip being disposed upon and in abutment with said refrigerator door flange, and adhesive means holding said replacement gasket in place relative to said refrigerator door gasket.

References Cited in the file of this patent

UNITED STATES PATENTS

| | | |
|---|---|---|
| 456,058 | Poe et al. | July 14, 1891 |
| 2,091,791 | Newman | Aug. 31, 1937 |
| 2,267,279 | Kuenzli | Dec. 23, 1941 |
| 2,280,254 | Nave | Apr. 21, 1942 |
| 2,366,894 | Ellsworth | Jan. 9, 1945 |